(12) United States Patent
Amann et al.

(10) Patent No.: US 6,309,157 B1
(45) Date of Patent: Oct. 30, 2001

(54) SCREW WITH SLEEVE

(75) Inventors: Erich Amann, Rottenburg; Ralf Baron, Metzingen, both of (DE)

(73) Assignee: Elring Klinger AG, Dettingen (DE)

( * ) Notice: Subject to any disclaimer, the term of this patent is extended or adjusted under 35 U.S.C. 154(b) by 0 days.

(21) Appl. No.: 09/577,537

(22) Filed: May 24, 2000

(30) Foreign Application Priority Data

May 28, 1999 (DE) .............................. 199 24 502

(51) Int. Cl.[7] .............................. F16B 21/18; F16B 43/02

(52) U.S. Cl. .......................... 411/353; 411/533; 411/546

(58) Field of Search ........................................ 411/352, 353, 411/107, 533, 546, 970, 999

(56) References Cited

U.S. PATENT DOCUMENTS

| | | | |
|---|---|---|---|
| 3,221,794 | * | 12/1965 | Acres .................................... 411/353 |
| 4,892,000 | * | 1/1990 | Renk et al. ...................... 411/533 X |
| 5,244,325 | * | 9/1993 | Knohl .................................... 411/353 |
| 5,336,028 | * | 8/1994 | Yamamoto ....................... 411/353 X |
| 5,807,052 | * | 9/1998 | Van Boven et al. ................ 411/353 |
| 6,044,536 | * | 4/2000 | Schneider ....................... 411/353 X |

* cited by examiner

Primary Examiner—Neill Wilson
(74) Attorney, Agent, or Firm—Michael J. Striker

(57) ABSTRACT

A screw-sleeve element has a screw having a screw shaft and a threaded region formed so that the screw shaft has a smaller diameter than an outer diameter of the threaded region; and a sleeve provided at an inner side with a narrow location having a diameter which is smaller than the outer diameter of the threaded region of the screw, so that the sleeve is non releasably arranged on the screw.

15 Claims, 8 Drawing Sheets

SCREW WITH SLEEVE

BACKGROUND OF THE INVENTION

The present invention relates in particular to screws provided with sleeves.

In machine construction, screws in the course of a high pre-manufacturing process are inserted through sleeves and then the manufacture is finished. For this purpose it is especially important that the sleeve is non-removably connected with the screw. In order to nonremovably connect the screw with the sleeve, the screw is provided on its shaft with a peripheral radially outwardly extending bead. Furthermore, the sleeve in accordance with the prior art is provided inside with a narrow point, so that the sleeve because of its narrow point and the peripheral bead of the screw can not be stripped from the screw. This solution however has the disadvantage that the utilized screws are not standard screws, but instead are specially manufactured screws with a concomitant high cost. Moreover, in the region of the peripheral bead there is a notch action, so that the screw at the point of the bead has a weak point.

SUMMARY OF THE INVENTION

Accordingly, it is an object of the present invention to provide screws with non-releasable sleeves, which however are not formed as special screws.

In keeping with these objects and with others which will become apparent hereinafter, one feature of present invention resides, briefly stated in a screw with a sleeve in which a screw shaft has a smaller diameter than an outer diameter of a threaded region and the sleeve has on an inner side a narrow point with a diameter smaller than the outer diameter of the threaded region of the screw so that the sleeve is non releasably arranged on the screw.

With the use of standard screws with a smaller size diameter than the outer diameter of the threaded portion, the screw obtains a transition from the shaft to the thread formed as a thickening which constitutes an abutment for the narrow location of the sleeve. With the use of standard screws, the release protection of the sleeve is obtained in less costly manner than before, since it is no longer necessary to use specially manufactured screws.

In order to provide a simple manufacture, the narrow location can be formed by at least one radially inwardly extending and outwardly embossed projection.

In accordance with another feature of the present invention it is favorable for manufacture when the projection is formed as a peripheral, continuous bead. At least one projection can be also formed by inwardly projecting edges of a piercing of the sleeve casing. These inwardly projecting edges have spring-elastic properties so that the edges make possible pushing of the screw through the sleeve. A sliding-out from the screw is however impossible since the inwardly projecting edges act as a barb.

For eliminating the embossing process of the sleeve, also openings can be formed in the sleeve casing. The projections of a spring element can snap into the openings from outside to form the narrow location.

It is advantageous for the manufacture when the narrow location is formed by a ring element which abuts against an abutment on the inner side of the sleeve.

A washer disk which is connected with the sleeve and non rotatably held in the screw can also form the narrow location. Therefore the washer disk performs on the one hand a function of securing the screw from an undesirable release, and furthermore, when the inner diameter of the washer disk is smaller than the thread outer diameter, it prevents stripping of the sleeve from the screw. With this solution, conventional screws can be used with non-releasable washer disks, and the sleeve can be for example welded, soldered or glued on the washer disk.

The sleeve and/or the washer disk can be slotted. Thereby the sleeve and/or the washer disk during passing of the narrow location formed by the washer disk is expanded over the screw thread and when the narrow point is completely displaced over the screw thread it is snapped back again.

In view of a cost-favorable manufacture in great numbers, the sleeve can be wound from a sheet metal punched blank. However, it is possible to produce it by deep drawing or turning. Longer sleeves however can be produced easier by winding than by deep drawing.

Based on calculations of the manufacturing cost and required strength, the sleeve can be composed for example of metal, synthetic plastic or rubber.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1A:
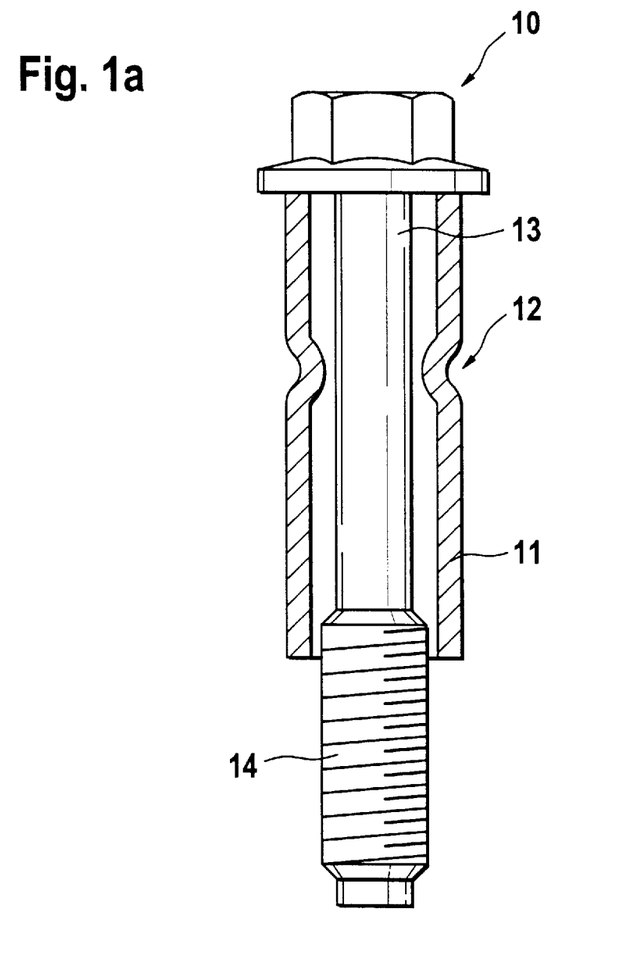
FIG. 1a is a side view of the first embodiment of the screw with a sleeve in accordance with the present invention.
Figure 1B:
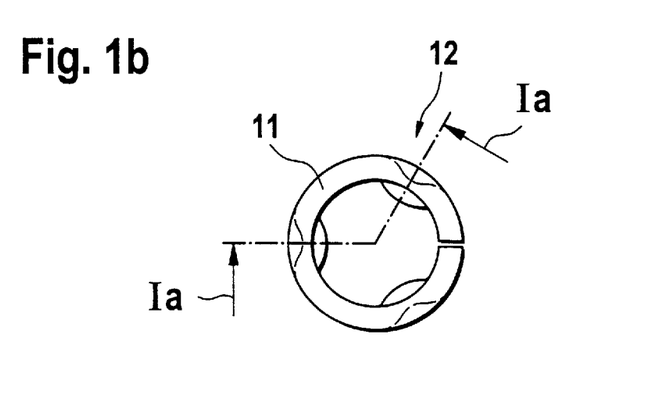
FIG. 1b is a view of the sleeve of FIG. 1a from below.

FIG. 1a shows a screw 10 with a sleeve 11. The sleeve 11 has three embossings 12 as shown in FIG. 1b, so that the sleeve at the location of the embossings 12 has a narrow location. The screw 10 has a shaft 13, whose outer diameter is smaller than the outer diameter of the thread 14. The outer diameter of the thread 14 is also greater than the inner diameter of the sleeve at the narrow location in the region of the embossings 12. Thereby the sleeve 11 can not slide downwardly from the screw 10. However, in order to provide fitting of the sleeve 11 on the screw 10, the embossings 12 can be first produced after fitting of the sleeve 11 on the screw 10. Alternatively, the embossings 12 can be embossed in unwound condition in a sheet metal punched blank. Subsequently the sheet metal punched blank is wound on the screw 10.

Figure 2A:
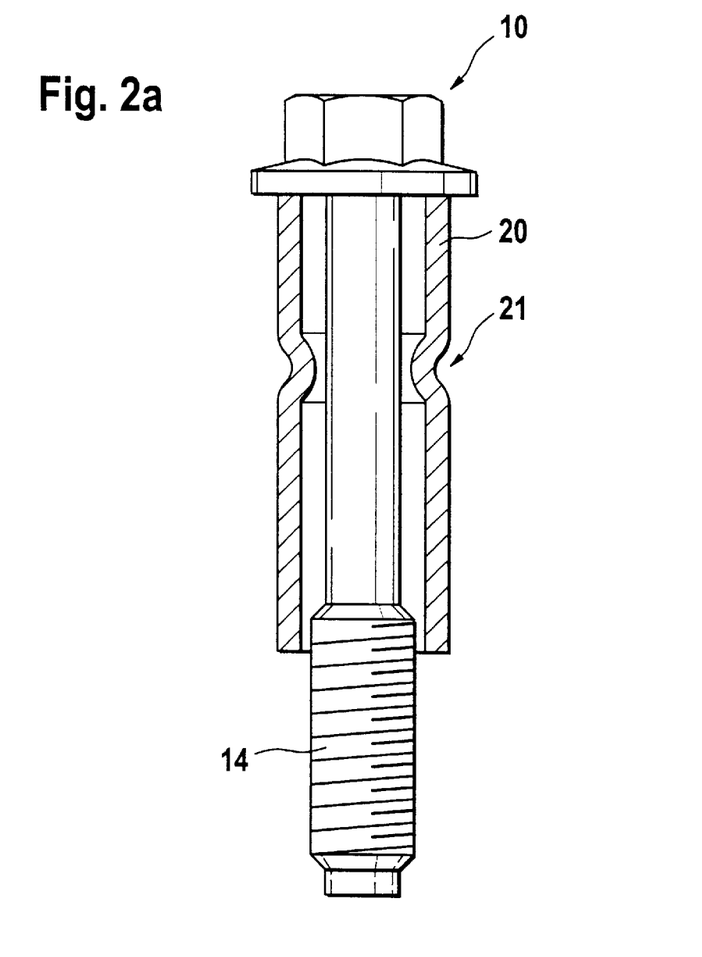
FIG. 2a is a side view of a second embodiment of a screw with the sleeve.
Figure 2B:
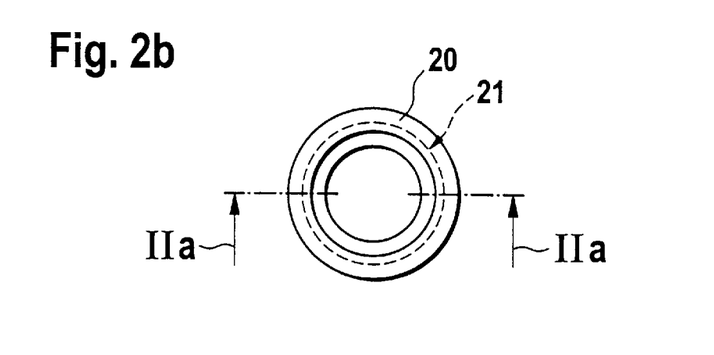
FIG. 2b is a view of the sleeve of FIG. 2a from below.

FIG. 2 shows the screw 10 of FIGS. 1a, 1b over which a sleeve 20 is drawn. The sleeve 20 has a radially inwardly extending circumferential or peripheral bead 21. In the region of the narrow location caused by the peripheral bead 21, the sleeve 20 has a smaller diameter than the outer diameter of the thread 14 of the screw 10. Thereby the sleeve in this embodiment is also non-releasably connected by the screw 10. FIG. 2b shows the sleeve 20 and the embossing 21 shown in a dotted line.

Figure 3A:
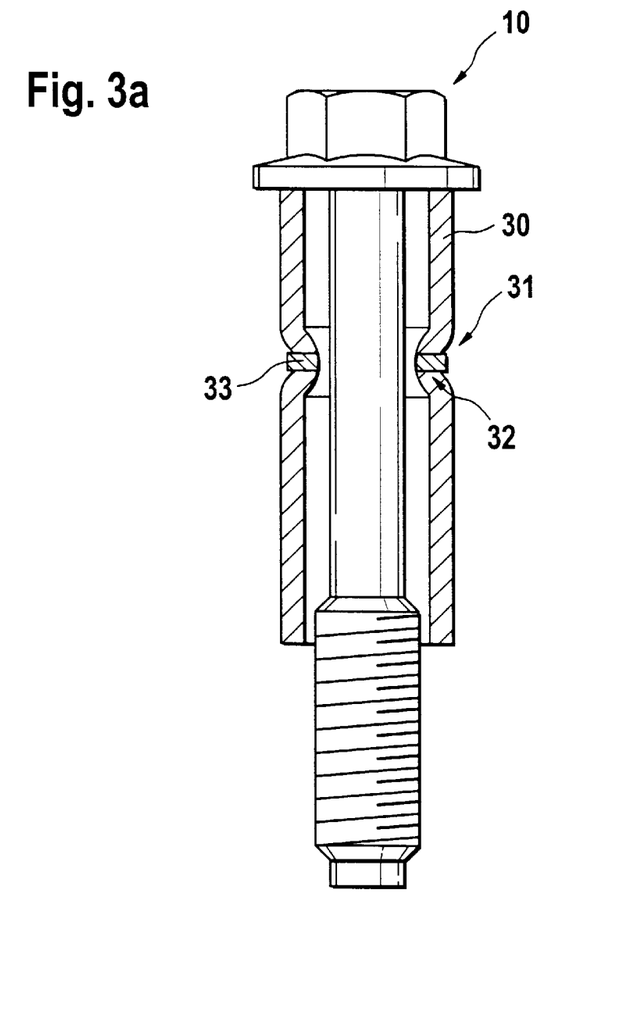
FIG. 3a is a side view of a third embodiment of a screw with the sleeve.
Figure 3B:
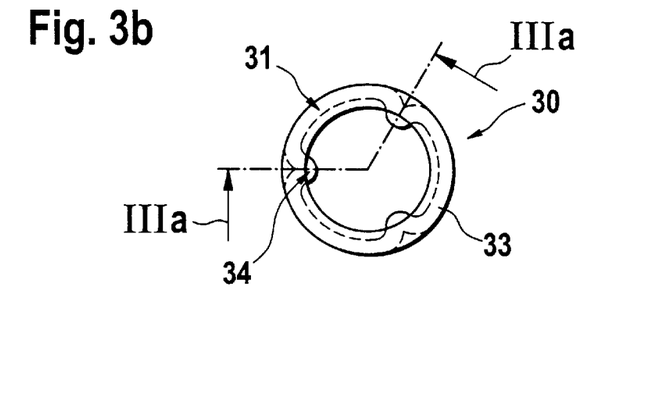
FIG. 3b is a view from up the sleeve of FIG. 3a from below.

FIG. 3a shows the screw 10 connected with a sleeve 30 in accordance with a further embodiment. The sleeve 30 in the region of a peripheral embossing 31 has three passages 32 as shown in FIG. 3b in which a spring element 33 can snap with projections 34. The spring element 33 is displaced from outside over the sleeve 30, until in the region of the embossing 31 it snaps with its projection 34 in the openings 32. It is however also possible that a spring element which is not shown here in detail is introduced into the sleeve from inside, until it is snapped in the region of the embossings 31 into the passages 32 and thereby the sleeve 30 becomes non-releasably connected with the screw. FIG. 3b shows the sleeve 30, the embossing 31 shown in a dotted line, and the spring element 33 with its projections 34.

Figure 4A:
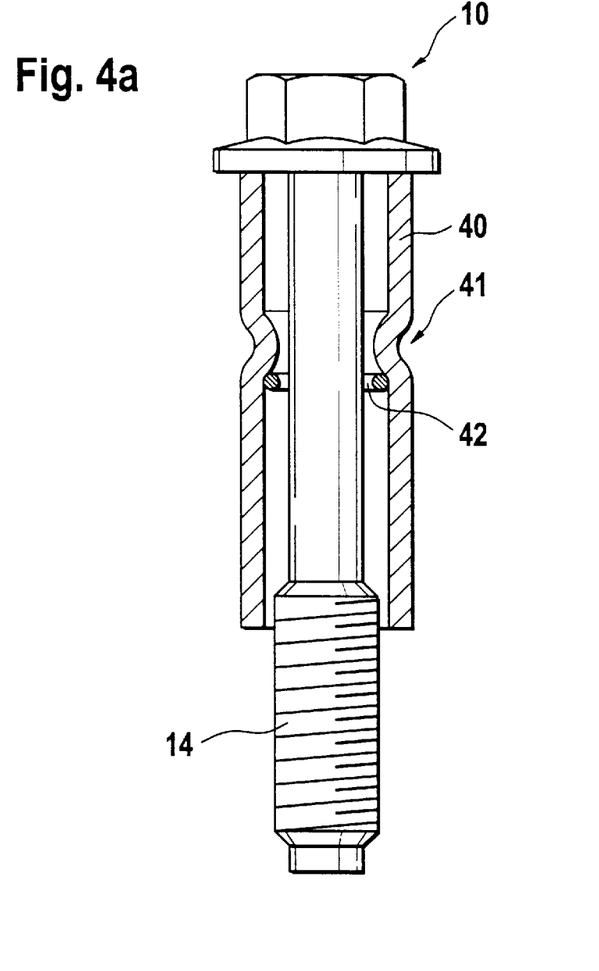
FIG. 4a is a side view of a fourth embodiment of a screw with the sleeve.
Figure 4B:
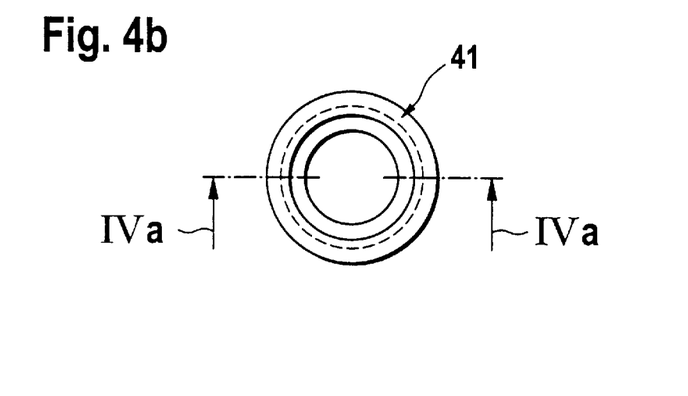
FIG. 4b is a view of the sleeve of FIG. 4a from below.

FIG. 4 shows the screw 10 which is inserted through a sleeve 40 shown in FIG. 4b. The sleeve 40 has a peripheral embossing 41 shown in FIG. 4b which forms an abutment for a ring element 42. The inner diameter of the ring element 42 is smaller than the outer diameter of the thread 14 of the screw 10. Thereby the sleeve 40 is non-releasably connected with the screw 10.

Figure 5A:
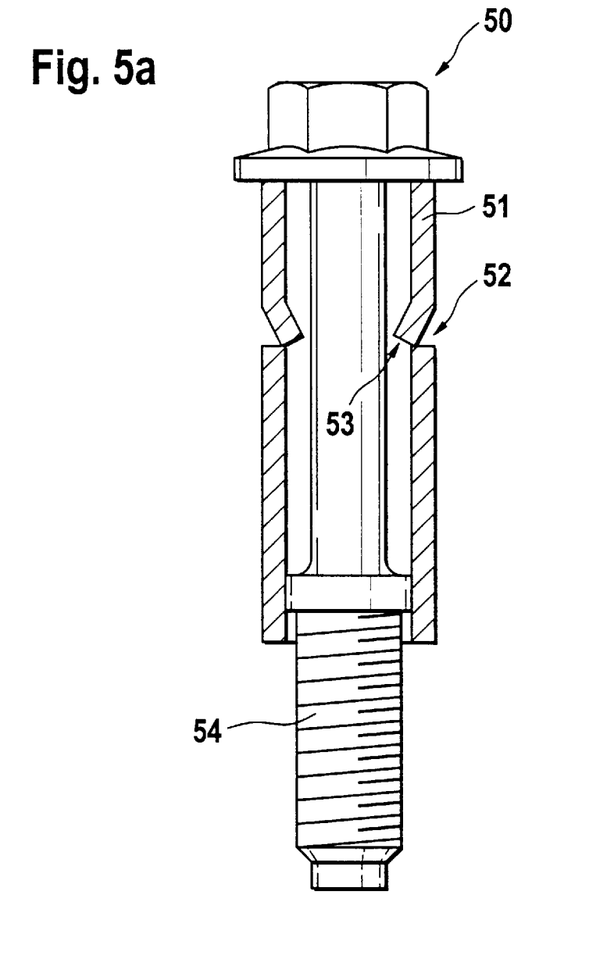
FIG. 5a is a side view of a fifth embodiment of a screw with a sleeve.
Figure 5B:
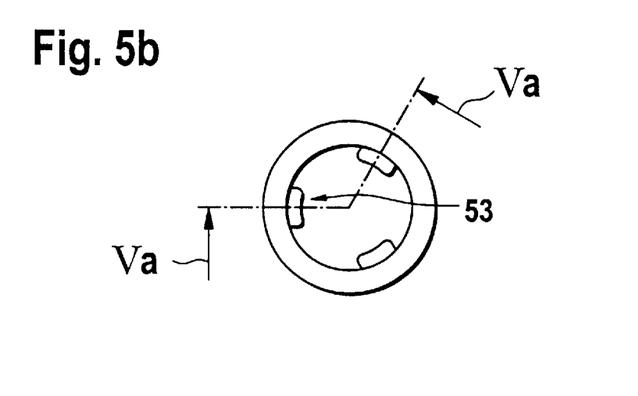
FIG. 5b is a view of the sleeve of FIG. 5a from below.

FIG. 5 shows a screw 50 which is designed differently from the screw 10 and is inserted through the sleeve 51. The sleeve 51 has a pushed-through region 52, so that inwardly projecting edges 53 shown in FIG. 5b are formed. The edges 33 form a narrow location, which is smaller than the outer diameter of the thread 54 of the screw 50. Advantageously, the pushings-through 52 in this embodiment can be provided between the mounting of the sleeve 51 with the screw 50. During mounting of the sleeve 51 on the screw 50, this preferably spring-elastic inwardly projecting edges 53 are pressed outwardly, until the thread 54 is completely displaced over the inwardly projecting ends 53. Then the inwardly projecting edges 53 act as barbs and prevent a sliding out of the screw 50 from the sleeve 51.

Figure 6:
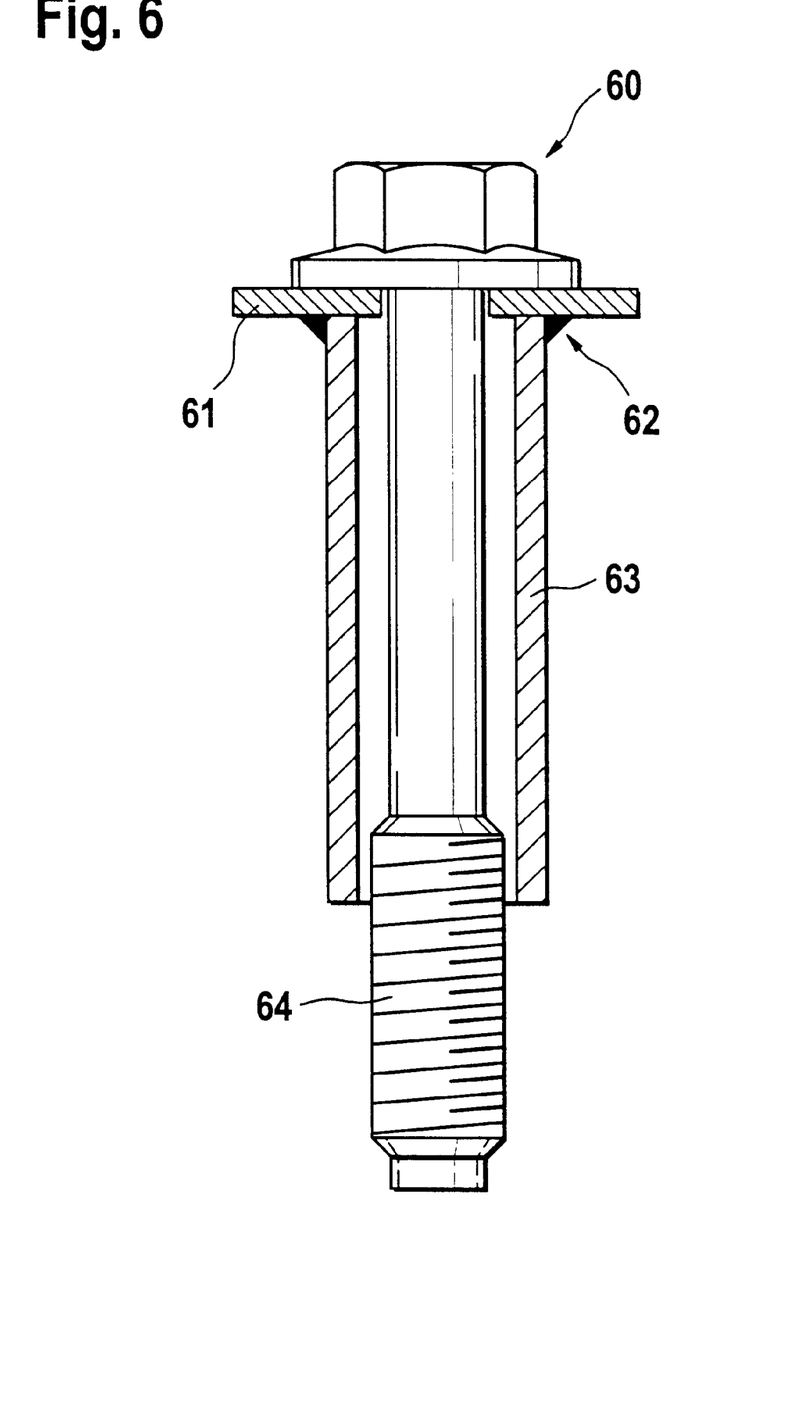
FIG. 6 is a side view of a sixth embodiment of a screw with a sleeve.

FIG. 6 shows a screw 60 with a non-releasable washer disk 61. A sleeve 63 is mounted on the washer disk 61, for example by glueing, welding or soldering. The inner diameter of the washer disk 61 is smaller than the outer diameter of the thread 64 of the screw 60. The washer disk 61 and the sleeve 63 can be also slotted.

FIG. 7 again shows the screw 60 with the non-releasable washer disk 61. The sleeve 63 here however is connected indirectly, and in particular through an element 65 composed of an elastomer with the washer disk 61. The element 65 is for example glued or vulcanized on the washer disk 61. The connection between the sleeve 60 and the element 65 is produced by frictional connection of the element 65 which is pulled over the sleeve 63 with pretensioning.

Figure 7:
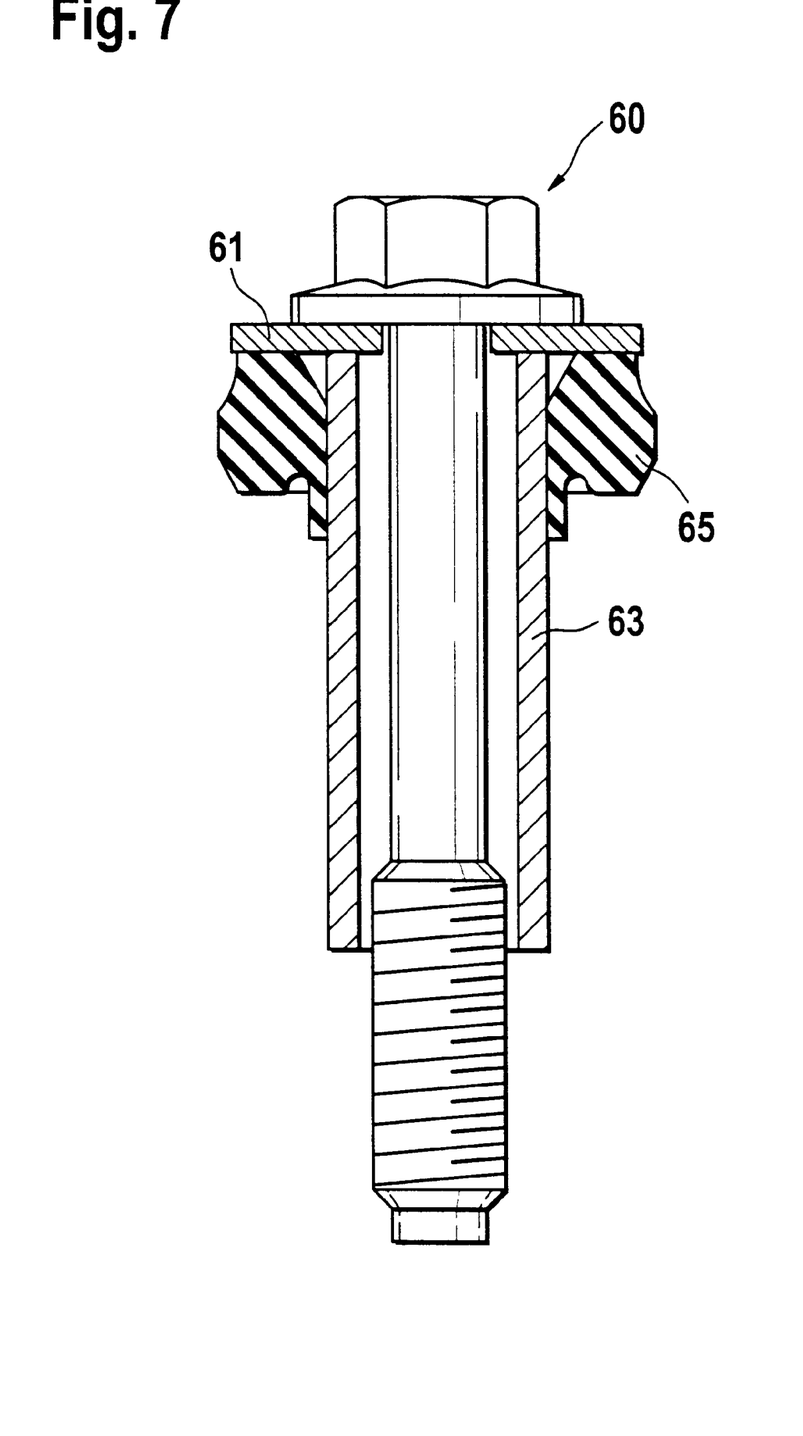
FIG. 7 is a side view of a seventh embodiment of a screw with a sleeve.
Figure 8:
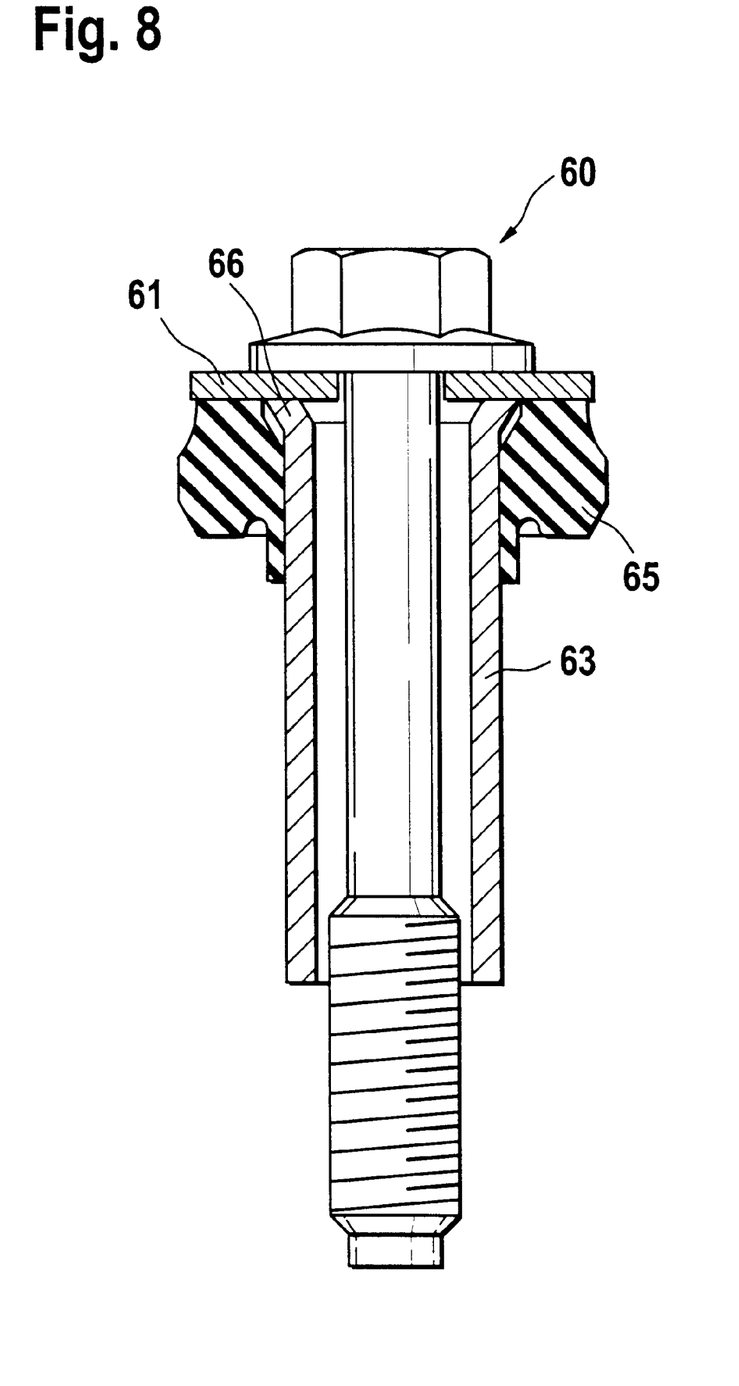
FIG. 8 is a side view of a eighth embodiment of a sleeve with a screw.

FIG. 8 shows a similar construction as in FIG. 7. Here however the element 65 is loosely pulled over the sleeve 63'.

The connection between the sleeve 63' and the element 65' is produced by an expanded upper edge 66 of the sleeve 63' which prevents falling of the sleeve 63 from the element 65' downwardly.

It will be understood that each of the elements described above, or two or more together, may also find a useful application in other types of constructions differing from the types described above.

While the invention has been illustrated and described as embodied in screw with sleeve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A screw-sleeve element, comprising a screw having a screw shaft and a threaded region formed so that said screw shaft has a smaller diameter than an outer diameter of said threaded region; and a sleeve provided at an inner side with a narrow location having a diameter which is smaller than said outer diameter of said threaded region of said screw, so that said sleeve is non-releasably arranged on said screw.

2. A screw-sleeve element as defined in claim 1, wherein said projection is formed as an outwardly embossed projection.

3. A screw-sleeve element as defined in claim 1, wherein said narrow location is formed by at least one radially inwardly extending projection.

4. A screw-sleeve element as defined in claim 3, wherein said at least one projection is formed as a peripheral bead.

5. A screw-sleeve element as defined in claim 1, wherein said narrow location is formed by a ring element which abuts against an abutment of an inner side of said sleeve.

6. A screw-sleeve element as defined in claim 1; and further comprising a washer disk which is connected with said sleeve and non-releasably held in said screw so as to form said narrow location.

7. A screw-sleeve element as defined in claim 1; and further comprising a washer disk which is connected with said sleeve and non-releasably held with said screw, said washer disk forming said narrow location.

8. A screw-sleeve element as defined in claim 1, wherein said sleeve is composed of a material selected from the group consisting of metal, synthetic plastic and rubber.

9. A screw-sleeve element, comprising a screw having a screw shaft and a threaded region formed so that said screw shaft has a smaller diameter than an outer diameter of said threaded region; and a sleeve provided at an inner side with a narrow location having a diameter which is smaller than said outer diameter of said threaded region of said screw, so that said sleeve is non-releasably arranged on said screw, and at least one projection having inwardly extending edges formed by piercing a casing of said sleeve.

10. A screw-sleeve element, comprising a screw having a screw shaft and a threaded region formed so that said screw shaft has a smaller diameter than an outer diameter of said threaded region; and a sleeve provided at an inner side with a narrow location having a diameter which is smaller than said outer diameter of said threaded region of said screw, so that said sleeve is non-releasably arranged on said screw, said sleeve having a casing provided with holes; and further comprising a spring element having projections which are snappable from outside into said holes so as to form said narrow location.

11. A screw-sleeve element, comprising a screw having a screw shaft and a threaded region formed so that said screw shaft has a smaller diameter than an outer diameter of said threaded region; and a sleeve provided at an inner side with a narrow location having a diameter which is smaller than said outer diameter of said threaded region of said screw, so that said sleeve is non-releasably arranged on said screw; a washer disk which is connected with said sleeve and non-releasably held with said screw, said washer disk forming said narrow location, said washer disk being slofted.

12. A screw sleeve element, comprising a screw having a screw shaft and a threaded region formed so that said screw shaft has a smaller diameter than an outer diameter of said threaded region; and a sleeve provided at an inner side with a narrow location having a diameter which is smaller than said outer diameter of said threaded region of said screw, so that said sleeve is non-releasably arranged on said screw; a washer disk which is connected with said sleeve and non-releasably held with said screw, said washer sleeve forming said narrow location, said sleeve being slotted.

13. A screw-sleeve element, comprising a screw having a screw shaft and a threaded region formed so that said screw shaft has a smaller diameter than an outer diameter of said threaded region; and a sleeve provided at an inner side with a narrow location having a diameter which is smaller than said outer diameter of said threaded region of said screw, so that said sleeve is non-releasably arranged on said screw; a washer disk which is connected with said sleeve and non-releasably held with said screw, said washer disk forming said narrow location, said sleeve and said washer disk being slotted by a thoroughgoing slot.

14. A screw-sleeve element, comprising a screw having a screw shaft and a threaded region formed so that said screw shaft has a smaller diameter than an outer diameter of said threaded region; and a sleeve provided at an inner side with a narrow location having a diameter which is smaller than said outer diameter of said threaded region of said screw, so that said sleeve is non-releasably arranged on said screw, said sleeve being formed as a sleeve which is wound of a material strip.

15. A screw-sleeve element, comprising a screw having a screw shaft and a threaded region formed so that said screw shaft has a smaller diameter than an outer diameter of said threaded region; and a sleeve provided at an inner side with a narrow location having a diameter which is smaller than said outer diameter of said threaded region of said screw, so that said sleeve is non-releasably arranged on said screw, said sleeve being slotted by a thoroughgoing slot.

* * * * *